United States Patent
Kamdar et al.

(10) Patent No.: US 11,972,189 B2
(45) Date of Patent: Apr. 30, 2024

(54) INTERCONNECTIONS FOR MODULAR DIE DESIGNS

(71) Applicant: QUALCOMM Incorporated, San Diego, CA (US)

(72) Inventors: Siddharth Kamdar, San Diego, CA (US); Christophe Avoinne, San Diego, CA (US); Sanjay Jaisingh Arya, New Delhi (IN); Manav Shah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 17/655,823

(22) Filed: Mar. 22, 2022

(65) Prior Publication Data

US 2023/0325576 A1  Oct. 12, 2023

(51) Int. Cl.
  *G11C 5/06*  (2006.01)
  *G06F 30/394*  (2020.01)
  *G11C 8/12*  (2006.01)

(52) U.S. Cl.
  CPC .............. *G06F 30/394* (2020.01); *G11C 5/06* (2013.01); *G11C 8/12* (2013.01)

(58) Field of Classification Search
  CPC .. G06F 30/394; G06F 2113/18; G06F 30/392; G11C 5/06; G11C 8/12
  See application file for complete search history.

(56) References Cited

U.S. PATENT DOCUMENTS

| | | | |
|---|---|---|---|
| 6,127,843 A | 10/2000 | Agrawal et al. | |
| 8,081,177 B2 | 12/2011 | White et al. | |
| 2019/0391757 A1* | 12/2019 | Seong | G06F 3/0604 |
| 2022/0070096 A1 | 3/2022 | Brewer | |

FOREIGN PATENT DOCUMENTS

EP  3907621 A1  11/2021

OTHER PUBLICATIONS

Lan, J. et al., "An Automatic Chip-Package Co-Design Flow for Multi-core Neuromorphic Computing SiPs," 2020 IEEE 22nd Electronics Packaging Technology Conference (EPTC), Dec. 2020, IEEE, pp. 77-80.
International Search Report and Written Opinion for International Patent Application No. PCT/US2023/062460, dated Jun. 7, 2023, 14 pages.
"Infinity Fabric (IF)—AMD," WikiChip, Retrieved on Dec. 29, 2021, pp. 1-8, URL: https://en.wikichip.org/w/indexphp?title=amd/infinity_fabric&printable=yes.

* cited by examiner

*Primary Examiner* — Xiaochun L Chen

(74) *Attorney, Agent, or Firm* — Withrow & Terranova, PLLC (57) ABSTRACT

Interconnections for modular die designs are disclosed. In one aspect, a die that is a chiplet is designed and tested for suitability. After approval of the chiplet design, multiple dies or chiplets may be coupled together within a multi-die package to form a package having desired computing capabilities. After assembly, each chiplet is provided a unique identifier, such as by setting a fuse. Based on the unique identifier, each chiplet is made aware of how interfaces to other chiplets are configured so that signals may be routed appropriately. Using modular chiplets in this fashion reduces testing requirements and non-recurring expenses while increasing flexibility for design options.

18 Claims, 7 Drawing Sheets

| PHYSICAL ADDRESS | | CHIP ID (CHIP REGISTER) | | | |
|---|---|---|---|---|---|
| CHIPLET ID | DRAM/SOC | | | | |
| 39:36 | 35:0 | 0 | 1 | 2 | 3 |
| 000 | - | LOCAL DIE | LOCAL DIE | LOCAL DIE | LOCAL DIE |
| 0xx | - | RESERVED | RESERVED | RESERVED | RESERVED |
| 100 | X XXXX XXXX | LOCAL DIE | PORT 2 | PORT 1 | PORT 0 |
| 101 | X XXXX XXXX | PORT 0 | LOCAL DIE | PORT 2 | PORT 1 |
| 110 | X XXXX XXXX | PORT 1 | PORT 0 | LOCAL DIE | PORT 2 |
| 111 | X XXXX XXXX | PORT 2 | PORT 1 | PORT 0 | LOCAL DIE |

INTERCONNECTIONS FOR MODULAR DIE DESIGNS

BACKGROUND

I. Field of the Disclosure

The technology of the disclosure relates generally to interconnections for modular integrated circuit (IC) die designs.

II. Background

Computing devices abound in modern society, providing myriad functions for differing demands. With the increased functional possibilities, there has been a demand for increased computing requirements (e.g., more processing power), In the past, such increased computing requirements could be met by increasing a number of transistors within an integrated circuit (IC) die or by increasing the size of the die. As transistor size is approaching some theoretical limits in the low nanometer scale, adding transistors within a given space is becoming more challenging. Likewise, the size of dies is reaching some practical limits caused by current manufacturing processes. That is, as the size of a die increases, the yield for a given run is likely to diminish and there may be process variations across the die, which may lead to issues for managing internal latency and biasing requirements. Accordingly, there remains a need for better ways to design dies that allow for flexibility in meeting a variety of computational requirements.

SUMMARY

Aspects disclosed in the detailed description include interconnections for modular die designs. In particular, a die that is a chiplet is designed and tested for suitability, After approval of the chiplet design, multiple dies or chiplets may be coupled together within a multi-die package to form a package having desired computing capabilities. After assembly, each chiplet is provided a unique identifier, such as by setting a fuse. Based on the unique identifier, each chiplet is made aware of how interfaces to other chiplets are configured so that signals may be routed appropriately. Using modular chiplets in this fashion reduces testing requirements and non-recurring expenses while increasing flexibility for design options.

In this regard in one aspect, a method of forming a package is disclosed. The method includes placing a plurality of chiplets on a substrate. The method also includes setting a unique identifier for each chiplet. The method also includes forming a look-up table (LUT) for each chiplet for routing communication between chiplets based on the unique identifiers. The method also includes, based on the unique identifiers, configuring ports to route communication between chiplets.

In another aspect, a method of communication between chiplets in a package is disclosed. The method includes generating a signal at a logical block within a first chiplet in the package. The method also includes comparing an address for the signal to a LUT to determine a physical address. The method also includes sending the signal to a selected port based on the LUT.

In another aspect, a package is disclosed. The package includes a substrate. The package also includes a plurality of chiplets mounted on the substrate and interconnected to one another. Each chiplet of the plurality of chiplets includes a unique identifier. Each chiplet also includes a plurality of ports. Each chiplet also includes a LUT. Each chiplet also includes a control circuit configured to discriminate whether signals generated within the chiplet are local or directed to a different chiplet based on the LUT.

In another aspect, a package is disclosed. The package includes a substrate. The package also includes a plurality of chiplets mounted on the substrate and interconnected to one another. Each chiplet of the plurality of chiplets includes a unique identifier. Each chiplet also includes a plurality of ports. Each chiplet also includes a control circuit configured to route signals generated within the chiplet to a local address or to a different chiplet within the plurality of chiplets based on a chiplet identifier within the signal.

In another aspect, a package is disclosed. The package includes a substrate. The package also includes a plurality of chiplets mounted on the substrate and interconnected to one another. Each chiplet of the plurality of chiplets includes a unique identifier. Each chiplet also includes a plurality of ports. Each chiplet also includes a control circuit configured to route signals generated within the chiplet to a local address or to an outgoing port based on a chiplet identifier.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Figure 1:
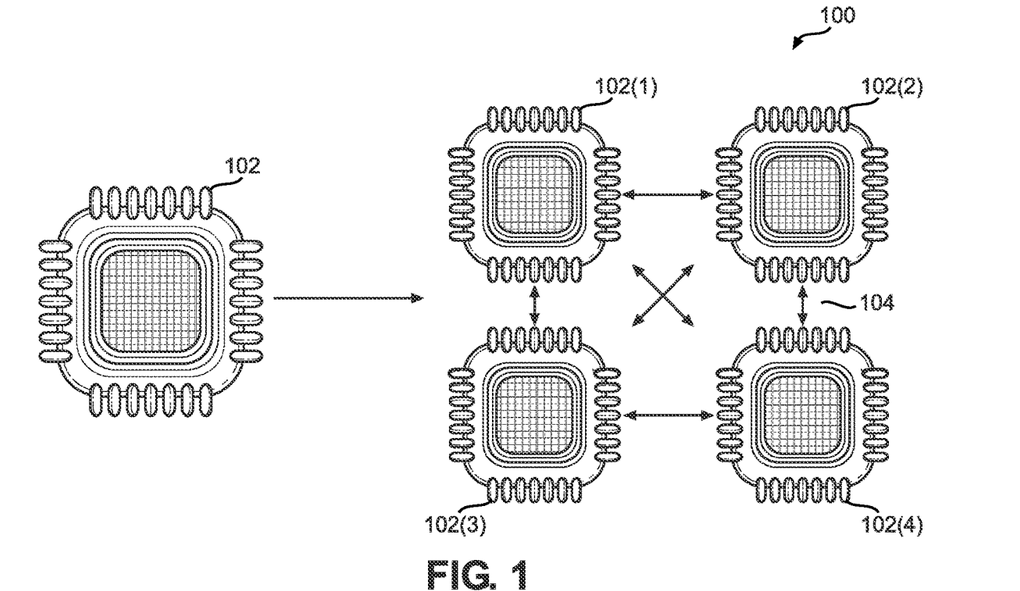
FIG. 1 is a stylized diagram of an exemplary chiplet being integrated into a multi-chiplet package.

Aspects disclosed in the detailed description include interconnections for modular die designs. In particular, a die that is a chiplet is designed and tested for suitability. After approval of the chiplet design, multiple dies or chiplets may be coupled together within a multi-die package to form a package having desired computing capabilities. After assembly, each chiplet is provided a unique identifier, such as by setting a fuse. Based on the unique identifier, each chiplet is made aware of how interfaces to other chiplets are configured so that signals may be routed appropriately. Using modular chiplets in this fashion reduces testing requirements and non-recurring expenses while increasing flexibility for design options In this regard, FIG. 1 is a stylized illustration of a package 100 that is formed from a plurality of homogeneous chiplets 102(1)-102(4). The chiplets 102(1)-102(4) may be mounted on a substrate 104 such as a laminate with metallization layers (not shown) therein (e.g., a printed circuit board (PCB)). The metallization layers may include vias and conductors to interconnect pins on the chiplets 102(1)-102 (4). The package 100 may include a molded overcovering (not shown) or the like.

Note further that while four chiplets 102(1)-102(4) are shown in the package 100, exemplary aspects of the present disclosure are not limited to just four. For example, packages could be formed with two to ten (or more) chiplets 102. Where the chiplets 102 are homogeneous, it may make sense geometrically that an even number of chiplets 102 may be used, and more logically, it may be a power of two number of chiplets 102 (e.g., two, four, eight, etc.).

While all the chiplets 102(1)-102(4) are formed from a generic chiplet 102, it should be appreciated that the package 100 may be formed from heterogeneous chiplets (not shown). As still another possibility, a plurality of chiplets 102 may be homogeneous with one or more heterogeneous chiplets on the same package (e.g., three of the same and one different, two sets of two different chiplets, etc.). The advantage of using homogeneous chiplets 102(1)-102(4) is that only a single design and testing cycle is required. Each additional possible chiplet design will add additional design and testing cycles, which may increase non-recurring expenses, increase average unit cost, and/or delay time to market.

Figure 2:
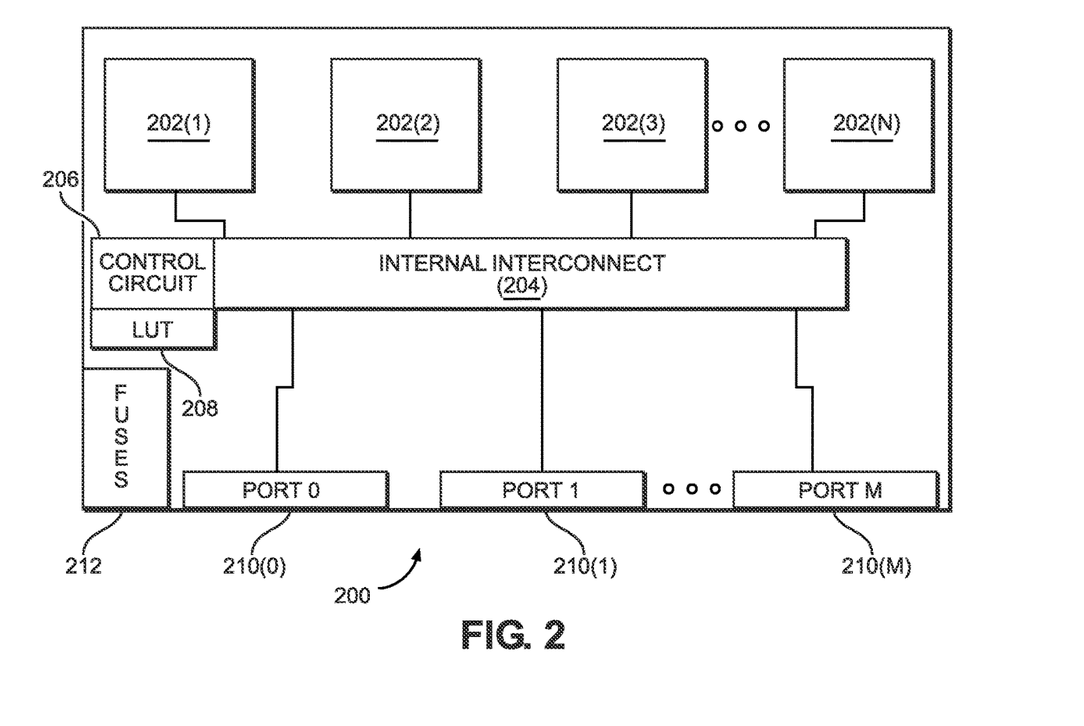
FIG. 2 is a block diagram of an exemplary chiplet with ports to make interconnections with other chiplets according to an exemplary aspect of the present disclosure.

FIG. 2 provides additional details about an exemplary chiplet 200, which may correspond to the chiplet 102 of FIG. 1. The chiplet 200 may include a variety of logical blocks 202(1)-202(N), which couple to an internal interconnect 204. The internal interconnect 204 may be associated with and/or controlled by a control circuit 206, which may control routing of communication based in part on the contents of a look-up table (LUT) 208. A plurality of input/output (I/O) ports 210(0)-210(M) may be coupled to the internal interconnect 204 to allow communication from the logical blocks 202(1)-202(N) to external elements such as logical blocks within another chiplet 102. Fuses 212 may be externally accessible and may be used to help designate a unique identifier for the chiplet 200 as will be explained in greater detail below.

When multiple chiplets 102 or 200 are assembled into a package, there will be instances when a logical block in one chiplet needs to communicate with a logical block in another chiplet. If there are multiple identical chiplets, there may be a need to differentiate therebetween for interchiplet communication. Exemplary aspects of the present disclosure contemplate using the fuses 212 to help with this communication challenge. In particular, the fuses 212 may be used to set a unique identifier e.g., a unique series of bit(s)) for the chiplet 200 as better explained with reference to FIGS. 3-5.

Figure 3:
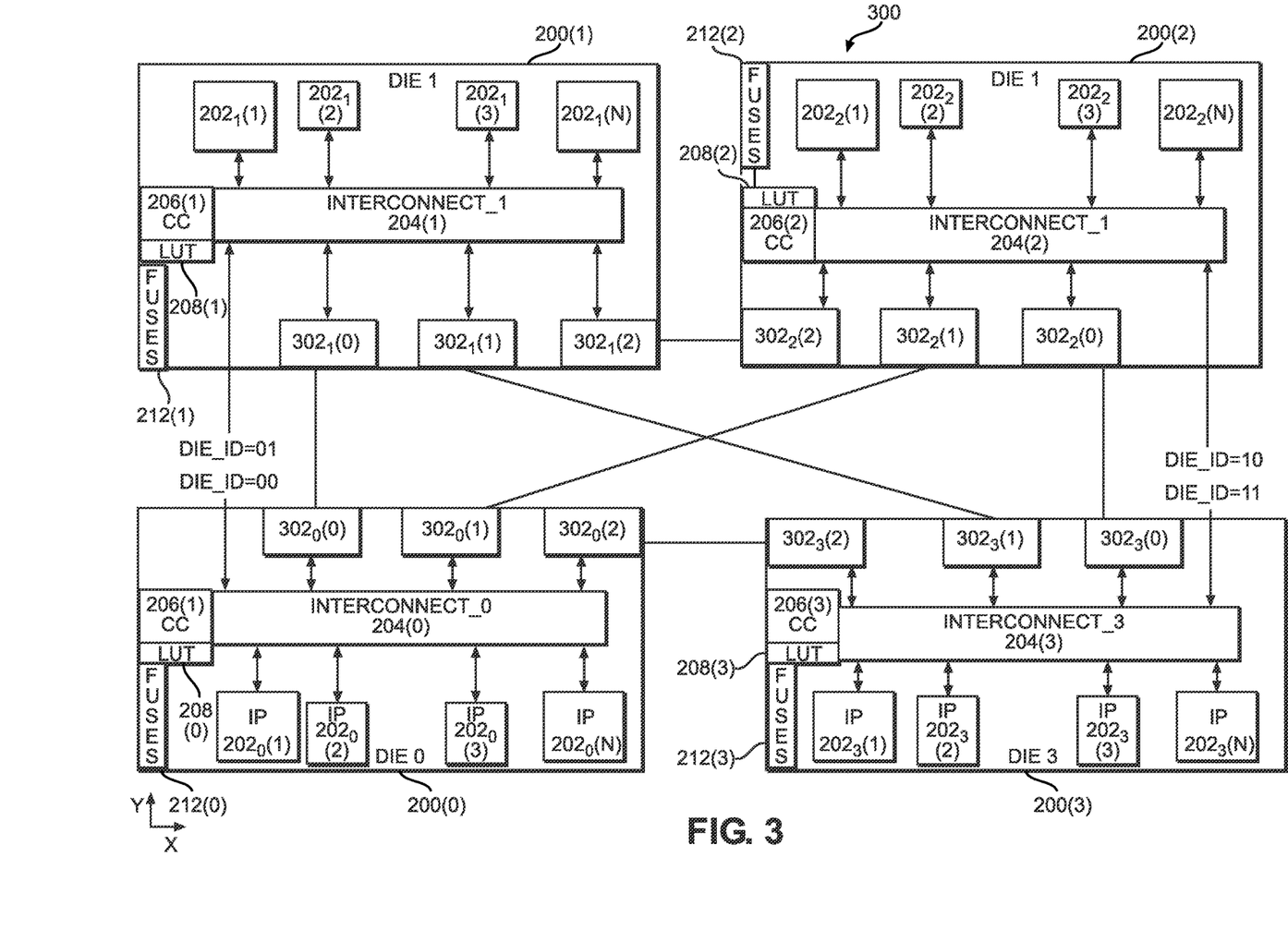
FIG. 3 is a block diagram of an exemplary package using four homogeneous chiplets with interconnections therebetween according to an exemplary aspect of the present disclosure.

In this regard, FIG. 3 illustrates a package 300 that is similar to the package 100 of FIG. 1. The package 300 includes four chiplets 200(0)-200(3). The respective fuses 212(0)-212(3) may be set during integration into the package 300 to indicate a particular die identifier (Die_ID). As illustrated, the chiplet 200(0) has a Die_ID of 00; chiplet 200(1) has a Die_ID of 01; chiplet 200(2) has a Die_ID of 10 (2 in binary); and chiplet 200(3) has a Die_ID of 11 (3 in binary). The respective control circuits 206(0)-206(3) may read the fuses 212(0)-212(3) and configure ports 302 based on the contents of the respective LUTs 208(0)-208(3). In particular, each chiplet 200(0)-200(3) has three ports $302_0(0)$-$302_0(2)$-$302_3(0)$-$302_3(2)$ (corresponding to ports 210(0)-210(M) of FIG. 2). Before the fuses 212(0)-212(3) are set, the ports $302_0(0)$-$302_0(2)$-$302_3(0)$-$302_3(2)$ look the same to the respective internal interconnects 204(0)-204(3), By setting the fuses 212(0)-212(3) to provide the unique Die_IDs, the control circuits 206(0)-206(3) now treat the ports $302_0(0)$-$302_0(2)$-$302_3(0)$-$302_3(2)$ differently based on the Dig. IDs. Thus, for the chiplet 200(0), the control circuit 206(0) knows that the port $302_0(0)$ is coupled to the chiplet 200(1), the port $302_0(1)$ is coupled to the chiplet 200(2), and the port $302_0(2)$ is coupled to the chiplet 200(3). Thus, if a communication from a logical block $202_0(1)$-$202_0(N)$ within the chiplet 200(0) is destined to a logical block $202_2(3)$ within the chiplet 200(2), the control circuit 206(0) causes the communication to pass through the internal interconnect 204(0) to port $302_0(1)$.

In the interests of completeness, for chiplet 200(1), the control circuit 206(1) knows that the port $302_1(0)$ is coupled to the chiplet 200(0), the port $302_1(1)$ is coupled to the chiplet 200(3), and the port $302_1(2)$ is coupled to the chiplet 200(2). For chiplet 200(2), the control circuit 206(2) knows that the port 302(0) is coupled to the chiplet 200(3), the port $302_2(1)$ is coupled to the chiplet 200(0), and the port $302_2(2)$ is coupled to the chiplet 200(1). For the chiplet 200(3), the control circuit 206(3) knows that the port $302_3(0)$ is coupled to the chiplet 200(2), the port $302_3(1)$ is coupled to the chiplet 200(1), and the port $302_3(2)$ is coupled to the chiplet 200(0). It should be appreciated that these connections may be a function of the positioning of the chiplets 200(0)-200(3) such that in most cases, the chiplets 200(0)-200(3) are mirrored about different axes. For example, chiplet 200(3) is mirrored about the y-axis relative to chiplet 200(0), and chiplet 200(1) is mirrored about the x-axis relative to the chiplet 200(0). This mirroring causes the ports $302_0(0)$-$302_0(2)$-$302_3(0)$-$302_3(2)$ to align as shown. If the chiplets 200 (0)-200(3) are rotated or are not homogeneous, then the ports $302_0(0)$-$302_0(2)$-$302_3(0)$-$302_3(2)$ may align differently and have different interchiplet connections. While not required, a general goal would be to keep the distance of such interchiplet connections minimized to reduce latency and potentially reduce the opportunities for crosstalk or other forms of electromagnetic interference.

It should be appreciated that if there are fewer or more than four chiplets, fewer or more bits may be required in the fuses 212. Likewise, fewer or more ports 302 may be required with corresponding entries in the LUT 208.

Figure 4:
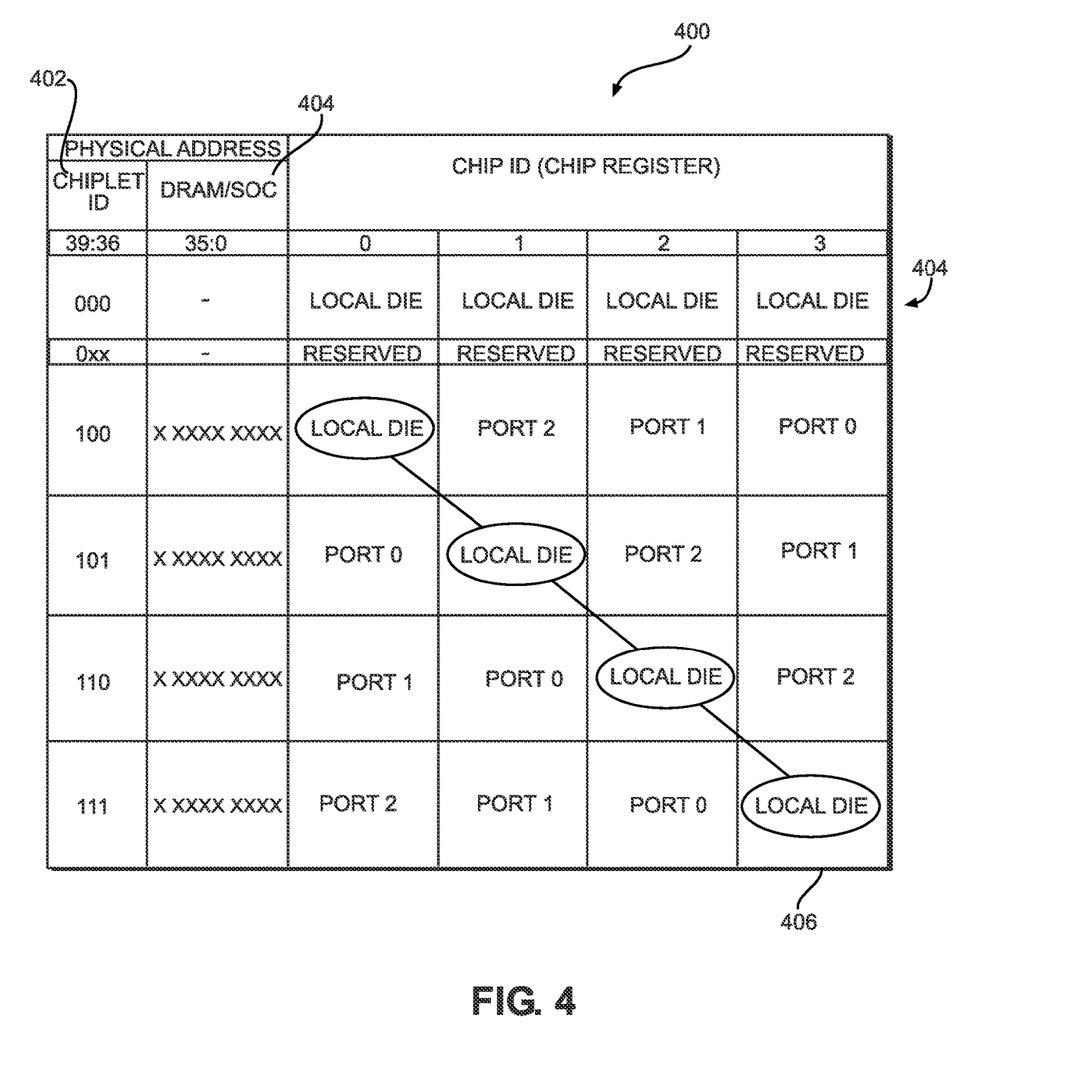
FIG. 4 is a table showing how addressing may work for interconnected chiplets within a die.
Figure 5:
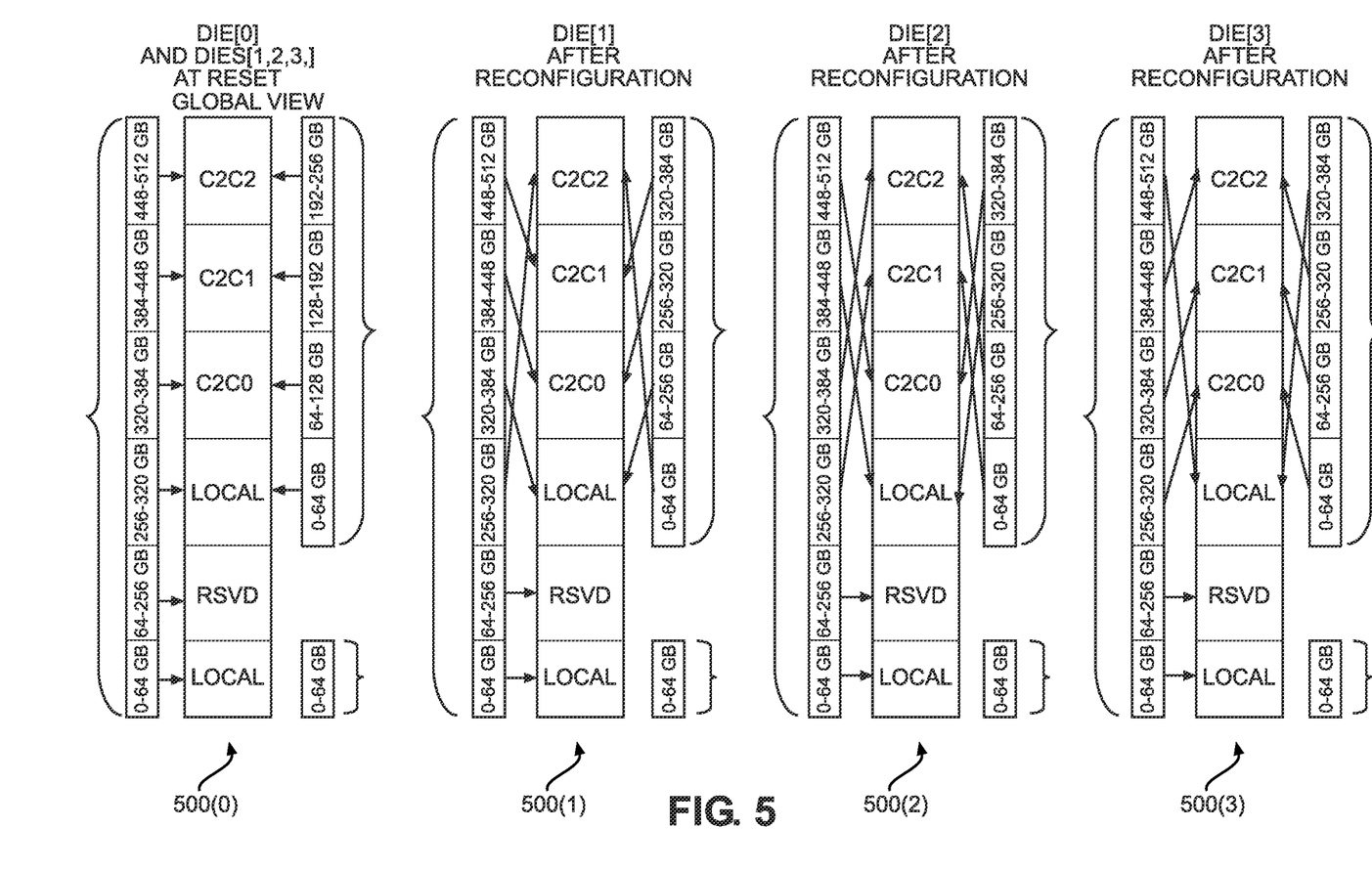
FIG. 5 provides a table showing how memory mapping may work for interconnected chiplets within a die.

FIGS. 4 and 5 illustrate further nuances for the routing. For the sake of example, it is assumed that each chiplet 200 has sixty-four gigabytes (64 GB) of memory in the logical blocks 202. With reference to FIG. 4 and table 400 therein, the control circuit 206(0)-206(3) may prepend a chiplet identifier 402 to a physical address 404 used by a logical block 202, where the chiplet identifier 402 may include a number of bits equal to one plus the number of bits required to identify uniquely the chiplets. Thus, for four chiplets 200(0)-200(3), the chiplet identifier 402 may be three bits (1 plus 2 bits to identify four chiplets). If there are more chiplets, the chiplet identifier 402 may be more than three bits. The first bit may be a local or remote identifier. That is, for example, a first bit of zero may indicate that the communication is local. Thus, as shown by line 404, a chiplet identifier of 000 will reference the memory elements of the local chiplet. Other zero leading chiplet identifiers 402 may be reserved for future use. If the first bit is a one, this use may indicate that the following bits identify to which chiplet (and the corresponding port) the communication is addressed. It should be noted that there will be cases where the chiplet identifier starts with a 1, but still is for a local address (shown generally at 406).

FIG. 5 expands on the concept of the table 400 of FIG. 4 and shows how there may be a default configuration memory map 500(0), which is preserved for chiplet 200(0) and modified configurations after setting the fuses 212(0)-212(3) as shown by memory maps 500(1)-500(3).

While fuses are specifically contemplated as a way to set the configurations for the control circuits, it should be appreciated that there may be other ways to achieve the same result. For example, software could reside in firmware that provides a logical-to-physical address mapping function. Still other hardware mechanisms (e.g., jumpers, short or open circuits, etc.) may also be used if desired.

Figure 6:
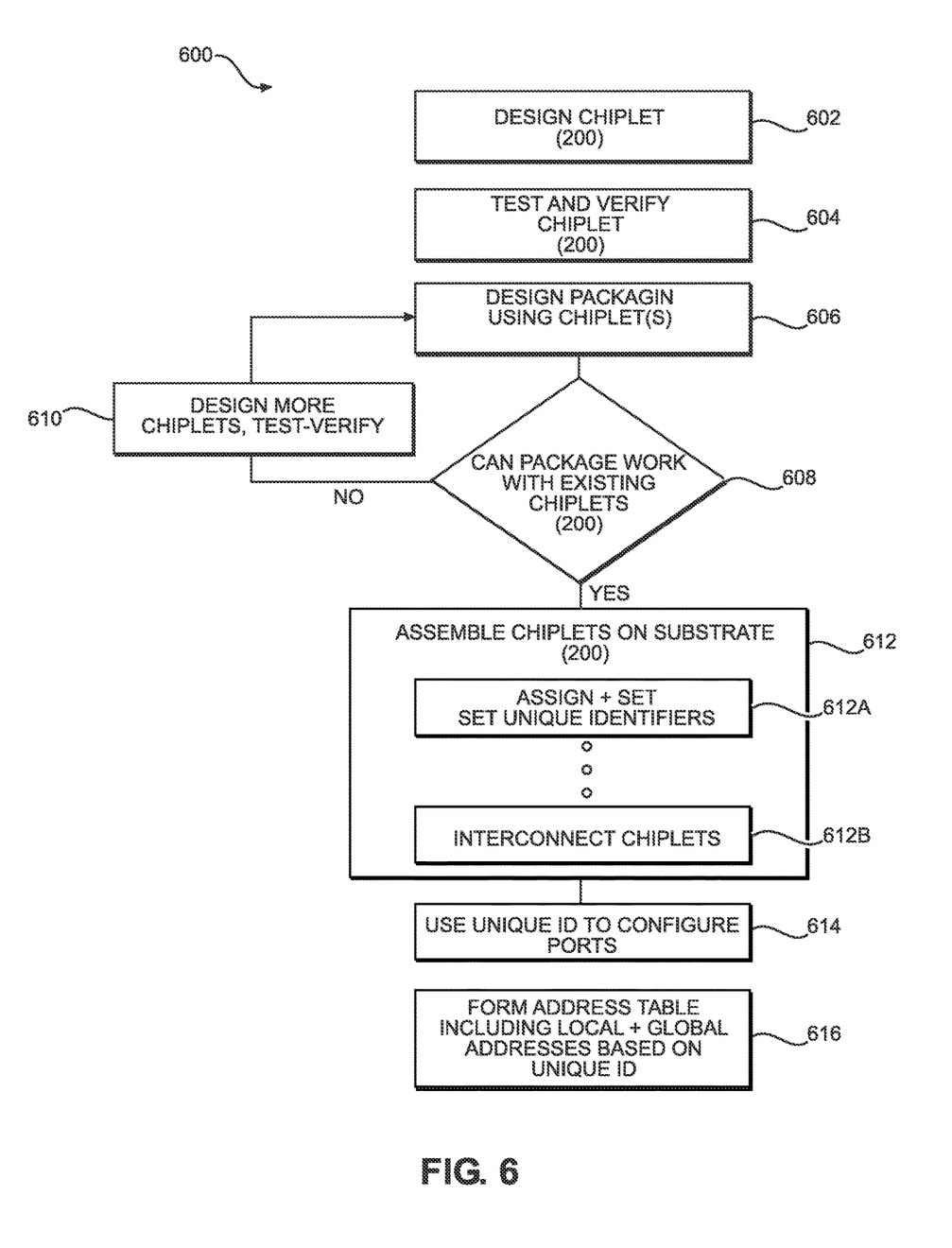
FIG. 6 is a flowchart illustrating an exemplary process for manufacturing a die from chiplets and making interconnections according to the present disclosure.

FIG. 6 illustrates a flowchart of a process 600 associated with the design and fabrication of a package having multiple modular dies with interconnections according to the present disclosure. In particular, the process 600 begins with the design of a chiplet 200 (block 602). The chiplet 200 is tested and verified (block 604). A computing requirement is then identified, and a package is designed using the chiplet 200 (block 606). The designer may then check to see if the package can work as intended with the existing chiplet (block 608). That is, the first chiplet 200 designed may be optimized for a neural processor or a graphics processor, but perhaps not both. If the package cannot be built with existing chiplets 200, then more chiplets 200 are designed, tested, and verified (block 610), and the designer determines if the package can now be built using existing chiplets 200. In this way, the package may be homogeneous chiplets 200 or a combination of heterogeneous chiplets 200.

Once the designer is satisfied with the design of the package, the package is formed by assembling chiplets 200 on a substrate 104 (block 612). As part of this step, each chiplet 200 may be assigned and have set a unique identifier (block 612A). Setting of the unique identifier may be done by setting fuses 212, grounding certain connections, setting a jumper, through software, or the like. The ports on the chiplets 200 are interconnected (block 612B). That is, the chiplets 200 may be soldered to contact points in the metallization layers of the substrate 104 such that conductors and vias in the metallization layers interconnect the pins of the ports of the chiplets 200. Note that it is possible that blocks 612A and 612B may be reversed temporally and the interconnections formed before setting the unique identifiers.

Once the unique identifiers are set, the control circuits may use the unique identifiers to configure the ports (block 614). That is, the control circuit 206 may use the LUT 208 to determine which ports are connected to which other chiplets. The control circuit 206 may also form an address table including local and global addresses based on the unique identifiers (block 616) (e.g., table 400 or memory mapping of FIG. 5).

The interconnections for modular die designs and packages assembled therefrom according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a pliable, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7:
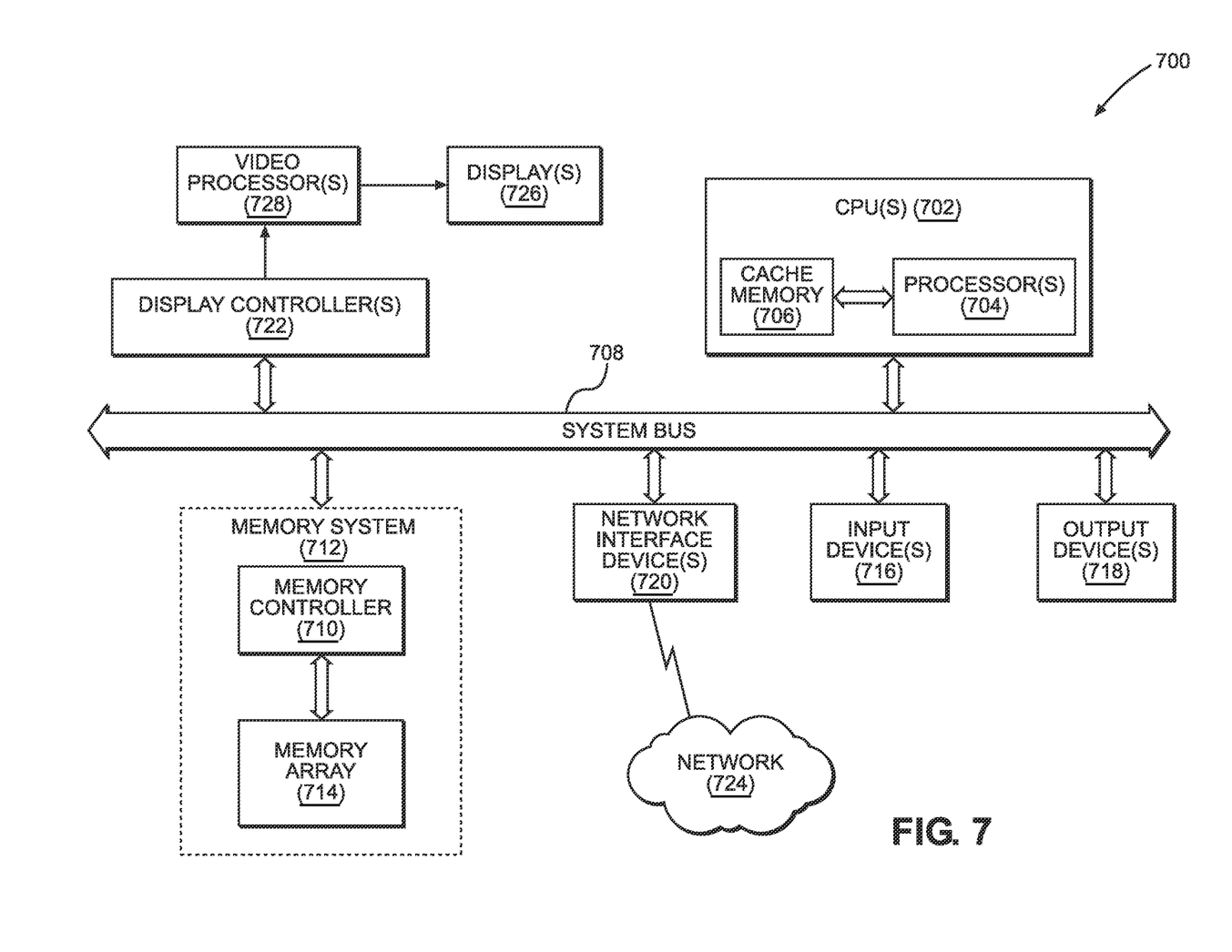
FIG. 7 is a block diagram of an exemplary processor-based system that can include a die formed from chiplets with interconnections according to the present disclosure.

As noted, the modular die designs of the present disclosure may be incorporated into a processor-based system. In this regard, FIG. 7 illustrates an example of a processor-based system 700 that can employ a package 300 such as illustrated in FIG. 3. In this example, the processor-based system 700 includes one or more central processing units (CPUs) 702, each including one or more processors 704. The processor(s) 704 may include the package 300. The CPU(s) 702 may have cache memory 706 coupled to the processor(s) 704 for rapid access to temporarily stored data. The CPU(s) 702 is coupled to a system bus 708 and can intercouple master and slave devices included in the processor-based system 700. As is well known, the CPU(s) 702 communicates with these other devices by exchanging address, control, and data information over the system bus 708. For example, the CPU(s) 702 can communicate bus transaction requests to a memory controller 710 as an example of a slave device. Although not illustrated in FIG. 7, multiple system buses 708 could be provided.

As illustrated in FIG. 7, these devices can include a memory system 712, one or more input devices 716, one or more output devices 718, one or more network interface devices 720, and one or more display controllers 722, as examples. The input device(s) 716 can include any type of input device, including, but not limited to, input keys, switches, voice processors, etc. The output device(s) 718 can include any type of output device, including, but not limited to, audio, video, other visual indicators, etc. The network interface device(s) 720 can be any devices configured to allow exchange of data to and from a network 724. The network 724 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) #can be configured to support any type of communications protocol desired. The memory system 712 can include one or more memory units 714(0-N).

The CPU(s) 702 may also be configured to access the display controller(s) 722 over the system bus 708 to control information sent to one or more displays 726. The display controller(s) 722 sends information to the display(s) 726 to be displayed via one or more video processors 728, which process the information to be displayed into a format suitable for the display(s) 726. The display(s) 726 can include any type of display, including, but not limited to, a cathode ray tube (CRT), a liquid crystal display (LCD), a plasma display, a light emitting diode (LED) display, etc.

Figure 8:
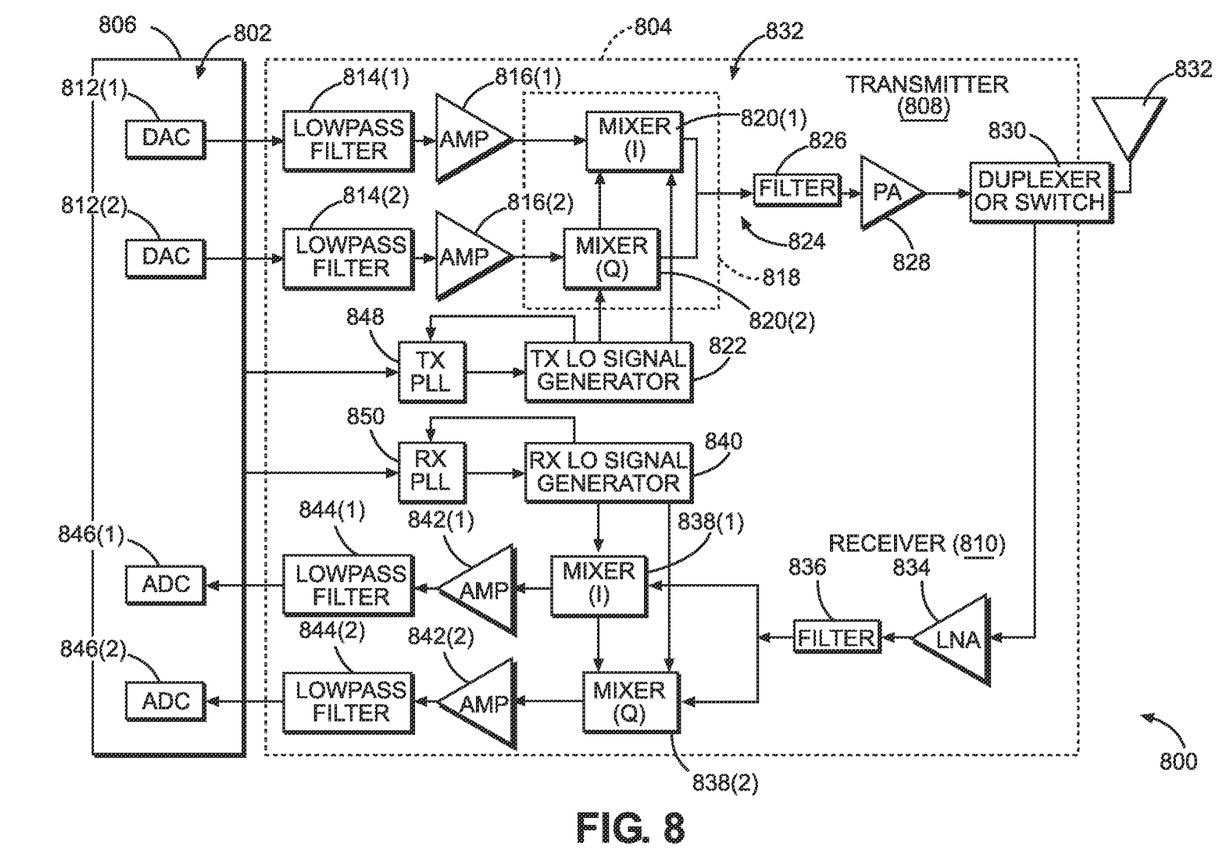
FIG. 8 is a block diagram of an exemplary transceiver circuit that may be present in a processor-based system that includes a die formed according to the present disclosure.

FIG. 8 illustrates an exemplary wireless communications device 800 that includes radio frequency (RF) components formed from one or more ICs 802, wherein any of the ICs 802 can include or be a package including multiple modular dies according to the present disclosure. The wireless communications device 800 may include or be provided in any of the above referenced devices, as examples. As shown in FIG. 8, the wireless communications device 800 includes a transceiver 804 and a data processor 806, The data processor 806 may include a memory to store data and program codes.

The transceiver 804 includes a transmitter 808 and a receiver 810 that support bi-directional communications. In general, the wireless communications device 800 may include any number of transmitters 808 and/or receivers 810 for any number of communication systems and frequency bands. All or a portion of the transceiver 804 may be implemented on one or more analog ICs, RF ICs (RFICs), mixed-signal ICs, etc.

The transmitter 808 or the receiver 810 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage. In the direct-conversion architecture, a signal is frequency-converted between RF and baseband in one stage. The super-heterodyne and direct-conversion architectures may use different circuit blocks and/or have different requirements. In the wireless communications device 800 in FIG. 8, the transmitter 808 and the receiver 810 are implemented with the direct-conversion architecture.

In the transmit path, the data processor 806 processes data to be transmitted and provides I and Q analog output signals to the transmitter 808. In the exemplary wireless communications device 800, the data processor 806 includes digital-to-analog converters (DACs) 812(1), 812(2) for converting digital signals generated by the data processor 806 into I and Q analog output signals, e.g., I and Q output currents, for further processing.

Within the transmitter 808, lowpass filters 814(1), 814(2) filter the I and Q analog output signals, respectively, to remove undesired signals caused by the prior digital-to-analog conversion. Amplifiers (AMPS) 816(1), 816(2) amplify the signals from the lowpass filters 814(1.), 814(2), respectively, and provide I and Q baseband signals. An upconverter 818 upconverts the I and Q baseband signals with I and Q transmit (TX) local oscillator (LO) signals from a TX LO signal generator 622 through mixers 820(1), 820(2) to provide an upconverted signal 824. A filter 826 filters the upconverted signal 824 to remove undesired signals caused by the frequency upconversion as well as noise in a receive frequency band. A power amplifier (PA) 828 amplifies the upconverted signal 824 from the filter 826 to obtain the desired output power level and provides a transmit RF signal. The transmit RF signal is routed through a duplexer or switch 830 and transmitted via an antenna 832.

In the receive path, the antenna 832 receives signals transmitted by base stations and provides a received RF signal, which is routed through the duplexer or switch 830 and provided to a low noise amplifier (LNA) 834. The duplexer or switch 830 is designed to operate with a specific receive (RX)-to-TX duplexer frequency separation, such that RX signals are isolated from TX signals. The received RF signal is amplified by the LISA 834 and filtered by a filter 836 to obtain a desired RF input signal. Downconversion mixers 838(1), 838(2) mix the output of the filter 836 with I and Q RX LO signals (i.e., LO_1 and LO_Q) from an RX LO signal generator 840 to generate I and Q baseband signals. The I and Q baseband signals are amplified by AMPs 842(1), 842(2) and further filtered by lowpass filters 844(1), 844(2) to obtain I and Q analog input signals, which are provided to the data processor 806. In this example, the data processor 806 includes analog-to-digital converters (ADCs) 846(1), 846(2) for converting the analog input signals into digital signals to be further processed by the data processor 806.

In the wireless communications device 800 of Figure Y, the TX LO signal generator 822 generates the I and Q TX signals used for frequency upconversion, while the RX LO signal generator 840 generates the I and Q RX LO signals used for frequency downconversion. Each LO signal is a periodic signal with a particular fundamental frequency. A TX phase-locked loop (PLL) circuit 848 receives timing information from the data processor 806 and generates a control signal used to adjust the frequency and/or phase of the TX LO signals from the TX LO signal generator 822. Similarly, an RX PLL circuit 850 receives timing information from the data processor 806 and generates a control signal used to adjust the frequency and/or phase of the RX LO signals from the RX LO signal generator 840.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired, To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure, Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A method of forming a package, the method comprising:
    placing a plurality of chiplets on a substrate;
    setting a unique identifier for each chiplet;
    forming a look-up table (LUT) for each chiplet for routing communication between chiplets based on the unique identifiers; and
    based on the unique identifiers, configuring ports to route communication between chiplets.
2. The method of clause 1, wherein the plurality of chiplets are homogeneous.
3. The method of clause 1, wherein the plurality of chiplets are heterogeneous.
4. The method of clauses 1 to 3, wherein setting the unique identifier comprises setting at least one fuse.
5. The method of clauses 1 to 3, wherein setting the unique identifier comprises grounding a circuit.
6. The method of clauses 1 to 3, wherein setting the unique identifier comprises setting the unique identifier using software.
7. The method of any preceding clause, wherein placing the plurality of chiplets on the substrate comprises forming interconnections therebetween using vias and conductors within metallization layers within the substrate.
8. The method of any preceding clause, further comprising assigning each chiplet the unique identifier prior to setting.
9. The method of any preceding clause, further comprising loading the look-up table (LUT) with global versus local address information based on the unique identifiers.
10. The method of any preceding clause, wherein placing the plurality of chiplets on the substrate comprises coupling a first port of a first chiplet to a first port of a second chiplet.
11. A method of communication between chiplets in a package, the method comprising:
    generating a signal at a logical block within a first chiplet in the package;
    comparing an address for the signal to a look-up table (LUT) to determine a physical address; and
    sending the signal to a selected port based on the LUT.
12. A package comprising:
    a substrate; and
    a plurality of chiplets mounted on the substrate and interconnected to one another;
    each chiplet of the plurality of chivies comprising:
        a unique identifier;
        a plurality of ports;
        a look-up table (LUT); and
        a control circuit configured to discriminate whether signals generated within the chiplet are local or directed to a different chiplet based on the LUT.
13. The package of clause 12, wherein the plurality of chiplets are homogeneous.
14. The package of clause 12, wherein the plurality of chiplets are heterogeneous.
15. The package of any of clauses 12 to 14, wherein the substrate comprises metallization layers including conductors and vias, and the plurality of chiplets are interconnected using the conductors and the vias,
16. A package comprising:
    a substrate; and
    a plurality of chiplets mounted on the substrate and interconnected to one another;
    each chiplet of the plurality of chiplets comprising:
        a unique identifier;
        a plurality of ports; and
        a control circuit configured to route signals generated within the chiplet to a local address or to a different chiplet within the plurality of chiplets based on a chiplet identifier within a signal.
17. The package of clause 16, wherein the chiplet identifier is prepended to an address within the signal.
18. The package of clause 16 or 17, wherein the chiplet identifier comprises a number of bits equal to one plus a number of bits required to identify uniquely the plurality of chiplets.
19. A package comprising:
    a substrate; and
    a plurality of chiplets mounted on the substrate and interconnected to one another;
    each chiplet of the plurality of chiplets comprising:
        a unique identifier;
        a plurality of ports; and
        a control circuit configured to route signals generated within the chiplet to a local address or to an outgoing port based on a chiplet identifier,

What is claimed is:
1. A method of forming a package, the method comprising:
    placing a plurality of chiplets on a substrate;
    setting a unique identifier for each chiplet by setting at least one fuse;
    forming a look-up table (LUT) for each chiplet for routing communication between chiplets based on the unique identifiers; and based on the unique identifiers, configuring ports to route communication between chiplets.

2. The method of claim 1, wherein the plurality of chiplets are homogeneous.

3. The method of claim 1, wherein the plurality of chiplets are heterogeneous.

4. The method of claim 1, wherein setting the unique identifier comprises grounding a circuit.

5. The method of claim 1, wherein setting the unique identifier comprises setting the unique identifier using software.

6. The method of claim 1, wherein placing the plurality of chiplets on the substrate comprises forming interconnections therebetween using vias and conductors within metallization layers within the substrate.

7. The method of claim 1, further comprising assigning each chiplet the unique identifier prior to setting.

8. The method of claim 1, further comprising loading the look-up table (LUT) with global versus local address information based on the unique identifiers.

9. The method of claim 1, wherein placing the plurality of chiplets on the substrate comprises coupling a first port of a first chiplet to a first port of a second chiplet.

10. A method of communication between chiplets in a package, the method comprising:
   generating a signal at a logical block within a first chiplet in the package;
   comparing an address for the signal to a look-up table (LUT) to determine a physical address, wherein each chiplet of the chiplets has a unique identifier defined by at least one fuse and wherein the LUT contains routing communication between the chiplets based on the unique identifiers; and
   sending the signal to a selected port based on the LUT.

11. A package comprising:
   a substrate; and
   a plurality of chiplets mounted on the substrate and interconnected to one another;
   each chiplet of the plurality of chiplets comprising:
      a unique identifier;
      a plurality of ports;
      a look-up table (LUT); and
      a control circuit configured to discriminate whether signals generated within the chiplet are local or directed to a different chiplet based on the LUT.

12. The package of claim 11, wherein the plurality of chiplets are homogeneous.

13. The package of claim 11, wherein the plurality of chiplets are heterogeneous.

14. The package of claim 11, wherein the substrate comprises metallization layers including conductors and vias, and the plurality of chiplets are interconnected using the conductors and the vias.

15. A package comprising:
   a substrate; and
   a plurality of chiplets mounted on the substrate and interconnected to one another;
   each chiplet of the plurality of chiplets comprising:
      a unique identifier;
      a plurality of ports; and
      a control circuit configured to route signals generated within the chiplet to a local address or to a different chiplet within the plurality of chiplets based on a chiplet identifier within a signal.

16. The package of claim 15, wherein the chiplet identifier is prepended to an address within the signal.

17. The package of claim 15, wherein the chiplet identifier comprises a number of bits equal to one plus a number of bits required to identify uniquely the plurality of chiplets.

18. A package comprising:
   a substrate; and
   a plurality of chiplets mounted on the substrate and interconnected to one another;
   each chiplet of the plurality of chiplets comprising:
      a unique identifier;
      a plurality of ports; and
      a control circuit configured to route signals generated within the chiplet to a local address or to an outgoing port based on a chiplet identifier.

* * * * *